(12) United States Patent
Cramer et al.

(10) Patent No.: US 10,814,763 B2
(45) Date of Patent: Oct. 27, 2020

(54) SYSTEMS AND METHODS FOR SECURING AN ASSIST GRIP ASSEMBLY TO A COMPONENT OF A VEHICLE

(71) Applicant: Illinois Tool Works Inc., Glenview, IL (US)

(72) Inventors: Cory Cramer, Mount Prospect, IL (US); Todd Callister, Chicago, IL (US); Walter Belchine, III, Plainfield, IL (US); Joseph Tassone, DeMotte, IN (US)

(73) Assignee: Illinois Tool Works Inc., Glenview, IL (US)

( * ) Notice: Subject to any disclaimer, the term of this patent is extended or adjusted under 35 U.S.C. 154(b) by 196 days.

(21) Appl. No.: 16/072,353

(22) PCT Filed: Nov. 29, 2016

(86) PCT No.: PCT/US2016/064022
§ 371 (c)(1),
(2) Date: Jul. 24, 2018

(87) PCT Pub. No.: WO2017/131851
PCT Pub. Date: Aug. 3, 2017

(65) Prior Publication Data
US 2020/0180486 A1 Jun. 11, 2020

Related U.S. Application Data

(60) Provisional application No. 62/288,722, filed on Jan. 29, 2016.

(51) Int. Cl.
*B60N 3/02* (2006.01)

(52) U.S. Cl.
CPC .................................. *B60N 3/026* (2013.01)

(58) Field of Classification Search
CPC .......... B60N 3/02; B60N 3/023; B60N 3/026; A47B 95/02; B60R 13/0206
(Continued)

(56) References Cited

U.S. PATENT DOCUMENTS 6,074,150 A * 6/2000 Shinozaki ........... B60R 13/0206
24/297
9,187,021 B2 * 11/2015 Kajio ..................... B60N 3/023
(Continued)

FOREIGN PATENT DOCUMENTS

DE 102010020056 A1 11/2011
DE 202013104000 U1 11/2013
(Continued)

OTHER PUBLICATIONS

International Search Report and Written Opinion for PCT/US2016/064022.
(Continued)

*Primary Examiner* — Gregory A Blankenship
(74) *Attorney, Agent, or Firm* — Quarles & Brady LLP

(57) ABSTRACT

An assist grip assembly is configured to be secured to a component. The assist grip assembly includes a handle defining a retention chamber, and a fastening assembly pivotally secured to the retention chamber of the handle. The fastening assembly includes a mounting cushion having a central channel and at least one mounting stud pivotally coupled to the retention chamber. The mounting cushion secures the fastening assembly to the handle. A retaining clip is coupled to the mounting cushion. The retaining clip is configured to secure to the component.

18 Claims, 7 Drawing Sheets

(58) Field of Classification Search
USPC .................. 296/1.02; 297/193.2; 16/409
See application file for complete search history.

(56) References Cited

U.S. PATENT DOCUMENTS

| | | | | |
|---|---|---|---|---|
| 2005/0091798 A1* | 5/2005 | Belchine, III | ......... | B60N 3/023 16/412 |
| 2009/0295180 A1* | 12/2009 | Boehner | ................ | B60N 3/026 296/1.02 |
| 2010/0175220 A1* | 7/2010 | Kajio | .................... | B60N 3/023 16/110.1 |
| 2011/0214255 A1* | 9/2011 | Kajio | .................... | B60N 3/023 16/429 |
| 2012/0080898 A1* | 4/2012 | Kajio | .................... | B60N 3/026 296/1.02 |
| 2012/0304418 A1* | 12/2012 | Kajio | .................... | B60N 3/023 16/110.1 |
| 2012/0305724 A1* | 12/2012 | Diez Herrera | ......... | B60N 3/026 248/231.81 |
| 2013/0019437 A1* | 1/2013 | Takai | .................... | B60N 3/023 16/429 |
| 2014/0093311 A1* | 4/2014 | Masuda | ................ | B60N 3/026 403/326 |
| 2015/0183356 A1* | 7/2015 | Aoyama | ................ | B60N 3/023 248/220.31 |
| 2015/0232011 A1* | 8/2015 | Kajio | ....................... | B60N 3/02 296/1.02 |
| 2016/0214520 A1* | 7/2016 | Kajio | .................... | B60N 3/023 |
| 2016/0236602 A1* | 8/2016 | Nagayama | ............ | B60N 3/023 |
| 2016/0297340 A1* | 10/2016 | Yang | ...................... | B60N 3/026 |
| 2018/0087306 A1* | 3/2018 | Nishida | .................... | E05F 1/12 |
| 2018/0154814 A1* | 6/2018 | Adachi | .................... | B60N 3/023 |

FOREIGN PATENT DOCUMENTS

| | | |
|---|---|---|
| JP | 2009 190652 | 8/2009 |
| WO | WO 2015/040872 | 3/2015 |

OTHER PUBLICATIONS

Office Action for Chinese patent application No. 201680079999.0, dated Jul. 3, 2020 (7 pages).

\* cited by examiner

US 10,814,763 B2

SYSTEMS AND METHODS FOR SECURING AN ASSIST GRIP ASSEMBLY TO A COMPONENT OF A VEHICLE

RELATED APPLICATIONS

This application is a National Phase of International Application No. PCT/US2016/064022, filed Nov. 29, 2016, which relates to and claims priority benefits from U.S. Provisional Patent Application No. 62/288,722 entitled "Assist Grip Retaining Clip," filed Jan. 29, 2016, both of which are hereby incorporated by reference in their entireties.

FIELD OF EMBODIMENTS OF THE DISCLOSURE

Embodiments of the present disclosure generally relate to systems and methods for securing an assist grip assembly to a component of a vehicle.

BACKGROUND

Assist grips are used in vehicles, such as to assist individuals into and out of driver and/or passenger seats. For example, an assist grip may be secured to a frame around a window of a vehicle proximate to a passenger seat. The assist grip is configured to rotate to an extended position. A passenger within a seat may grasp the assist grip and rotate it down to the extended position. The passenger may utilize the assist grip to assist him/herself into and out of the seat.

An assist grip is secured to the frame through one or more securing assemblies, which may include fasteners. However, the securing assemblies typically include flat engagement surfaces that are susceptible to bending, such as during impacts. In short, many known securing assemblies that are used to secure an assist grip to a frame of a vehicle may be compromised when subjected to various forces, such as during an impact (for example, a collision). Further, many known securing assemblies wear with use over time.

SUMMARY OF EMBODIMENTS OF THE DISCLOSURE

A need exists for a safe, robust, strong, stable, and reliable system for securing an assist grip assembly to a structural component, such as a frame of a vehicle.

With those needs in mind, certain embodiments of the present disclosure provide an assist grip assembly that is configured to be secured to a component. The assist grip assembly includes a handle defining a retention chamber, and a fastening assembly pivotally secured to the retention chamber of the handle. The fastening assembly includes a mounting cushion having a central channel and at least one mounting stud pivotally coupled to the retention chamber. The mounting cushion secures the fastening assembly to the handle. A retaining clip is coupled to the mounting cushion from a first side. The retaining clip is configured to secure to the component.

The fastening assembly may also include a cover coupled to the mounting cushion from a second side that is opposite from the first side. At least a portion of the retaining clip is received and retained within the central channel of the mounting cushion. At least a portion of the cover is received and retained with the central channel of the mounting cushion.

The handle may include a grasping beam connected to at least one extension beam. The retention chamber is formed in the extension beam.

The retaining clip may include a first leg connected to a second leg through a curved segment, a first retaining beam outwardly angled from the first leg, and a second retaining beam outwardly angled from the second leg. The second retaining beam outwardly angles away from the first retaining beam.

At least one of the first and second retaining beams may include at least one gusset. The gusset(s) progressively expands in width and height from an origin proximate to the curved segment toward a terminal end proximate to a distal end of one of the first retaining beam or the second retaining beam.

The retaining clip may include a first service tab extending from a distal end of the first retaining beam, and a second service tab extending from a distal end of the second retaining beam. The retaining clip may also include a third service tab extending from a distal end of the first leg, and a fourth service tab extending from a distal end of the second leg.

The retaining clip may include a first ledge outwardly extending from a distal end of the first leg. The first ledge is latched onto a first portion of the mounting cushion. A second ledge outwardly extends from a distal end of the second leg. The second ledge is latched onto a second portion of the mounting cushion.

In at least one embodiment, each of the first leg and the second leg includes two lateral stabilizers that together provide four retention locations that are configured to abut into a portion of the component. The portion of the component is configured to be securely sandwiched within a component-securing space between the four retention locations and a clip retainer of the mounting cushion.

The cover may include a cap, and a central pillar extending from the cap. The central pillar extends into the central channel of the mounting cushion. A hole may be formed through the central pillar. At least a portion of the retaining clip may be deflected into the hole.

Certain embodiments of the present disclosure provide a securing system that includes a component defining a retention channel, and an assist grip assembly secured to the component. The assist grip assembly includes a handle defining a retention chamber, and a fastening assembly pivotally secured to the retention chamber of the handle. The fastening assembly includes a mounting cushion having a central channel and at least one mounting stud pivotally coupled to the retention chamber. The mounting cushion secures the fastening assembly to the handle. A retaining clip is coupled to the mounting cushion. The retaining clip is secured to the component. At least a portion of the retaining clip is received and retained within the central channel of the mounting cushion.

Figure 1:
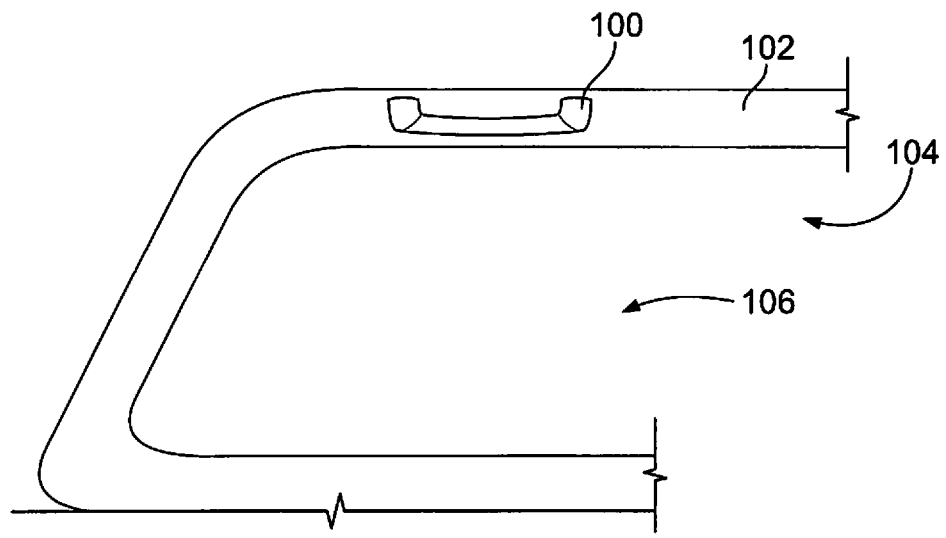
FIG. 1 illustrates a simplified lateral view of an assist grip assembly secured to a component of a vehicle, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a system for securing an assist grip to a structural component, such as a frame or bracket of a vehicle. Embodiments of the present disclosure provide a pin-less assist grip assembly that includes at least one fastening assembly that includes a retaining clip (which may be formed of metal), a mounting cushion (which may be formed of molded plastic), and a cap or cover (which may be formed of molded plastic). The fastening assembly is used to secure a handle of the assist grip assembly to a structural component, such as a frame of a vehicle. In at least one embodiment, the mounting cushion is secured to the handle through a snap-fit engagement that is devoid of a pivot pin.

The retaining clip is received and retained by the mounting cushion, such as within a central channel of the mounting cushion. The cover securely connects to the mounting cushion within the central channel opposite from the retaining clip. The cover may snapably secure to the mounting cushion.

Certain embodiments of the present disclosure provide a pin-less assist grip assembly that includes a robust retaining clip having contoured retention features.

FIG. 1 illustrates a simplified lateral view of an assist grip assembly 100 secured to a component 102 of a vehicle 104, according to an embodiment of the present disclosure. The component 102 may be a frame, bracket or the like of the vehicle 104. For example, the component 102 may be a frame surrounding a window 106 of the vehicle 104. The assist grip assembly 100 is pivotally secured to the component 102 through one or more fastening assemblies, as described below.

Figure 2:
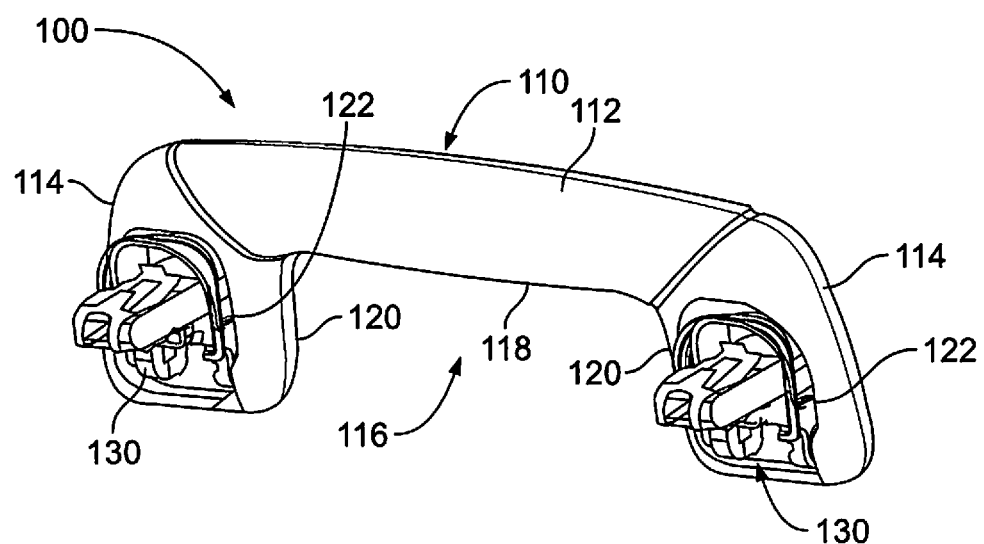
FIG. 2 illustrates a perspective rear view of an assist grip assembly, according to an embodiment of the present disclosure.

FIG. 2 illustrates a perspective rear view of the assist grip assembly 100, according to an embodiment of the present disclosure. The assist grip assembly 100 includes a handle 110 having a grasping beam 112 connected to opposed extension beams 114 at opposite ends of the grasping beam 112. The extension beams 114 are angled and/or curved with respect to the grasping beam 112 to provide a grasping clearance space 116 between an interior surface 118 of the grasping beam 112 and interior surfaces 120 of the extension beams 114.

Retention chambers 122 are formed in rear surfaces of the extension beams 114. Each retention chamber 122 receives and retains a fastening assembly 130. As shown, the assist grip assembly 100 includes two fastening assemblies 130 retained by two retention chambers 122. The fastening assemblies 130 are configured to pivotally secure the assist grip assembly 100 to the component 102 (shown in FIG. 1). Alternatively, the assist grip assembly 100 may include more or less fastening assemblies 130 than shown. For example, in at least one embodiment, the assist grip assembly 100 may include a single extension beam 114 extending from the grasping beam 112. The single extension beam 114 may include a retention chamber 122 that retains a single fastening assembly 130.

Figure 3:
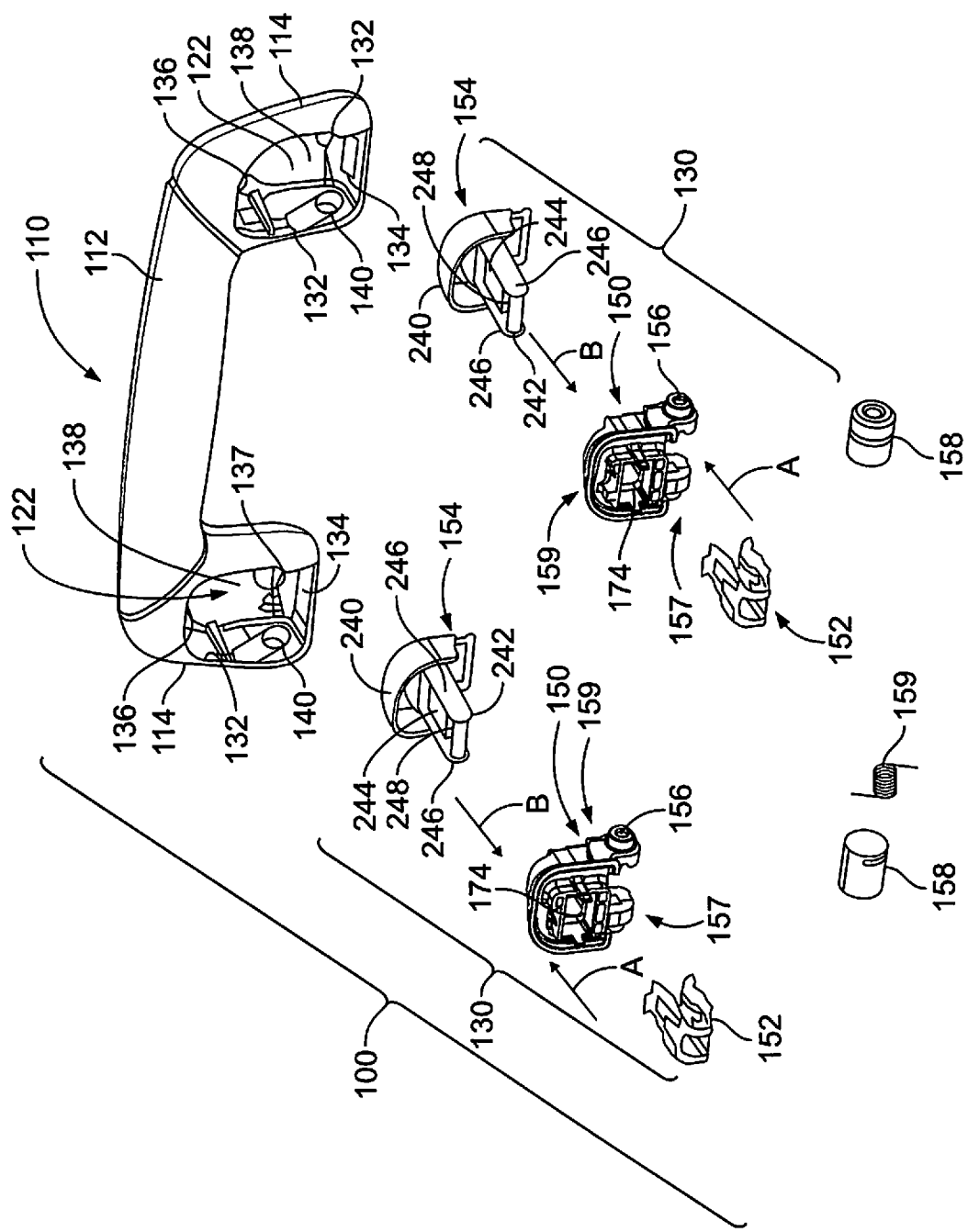
FIG. 3 illustrates a perspective rear exploded view of an assist grip assembly, according to an embodiment of the present disclosure.

FIG. 3 illustrates a perspective rear exploded view of the assist grip assembly 100, according to an embodiment of the present disclosure. The retention chambers 122 are recessed into the extension beams 114. Each retention chamber 122 is defined by recessed interior lateral walls 132 integrally connected to a recessed upper wall 134, a recessed lower wall 136, and a recessed front wall 138. A circular pivot channel 140 is formed in each lateral wall 132.

Each fastening assembly 130 includes a mounting cushion 150, a retaining clip 152, and a cover 154. The fastening assembly 130 pivotally secures to the extension beams 114 within the retention chambers 122. For example, cylindrical mounting studs 156 of the mounting cushions 150 are rotatably secured within the pivot channels 140 of the retention chambers 122. The mounting studs 156 provide cylindrical connectors that are pivotally secured within the pivot channels 140. The mounting studs 156 rotatably secured within the pivot channels 140 provide a rotation axle for the assist grip assembly 100. Because the mounting cushion 150 includes the integral mounting studs 156, a separate and distinct pivot pin is unnecessary. As such, the assist grip assembly 100 may be devoid of separate and distinct pivot pins.

Dampers 158 and/or springs 159 may also be used to couple the mounting cushions 150 within the retention chambers 122. The dampers 158 and the springs 159 may be used to limit or otherwise control pivotal motion of the handle 110 in relation to the fastening assemblies 130. As shown, dampers 158 may be used in both retention chambers 122, while only one retention chamber 122 may include the spring 159. In at least one other embodiment, a spring 159 may be secured within each retention chamber 122. Alternatively, the assist grip assembly 100 may not include the dampers 158 and/or the springs 159.

Referring to FIGS. 2 and 3, the assist grip assembly 100 is configured to be secured to a component, such as the component 102 (shown in FIG. 1). The assist grip assembly 100 includes the handle 110 that defines the retention chambers 122. A fastening assembly 130 is pivotally secured to each retention chamber 122 of the handle 110. Each fastening assembly 130 includes a mounting cushion 150 that includes a central channel 174 and at least one mounting stud 156 pivotally coupled to the retention chamber 122 (such as pivotally coupled to the pivot channel 140). The mounting cushion 150 secures the fastening assembly 130 to the handle 110. A retaining clip 152 is coupled to the mounting cushion 150 from a first side 157. The retaining clip 152 is configured to secure to the component 102, thereby securing the assist grip assembly 100 to the component 102. A cover 154 is coupled to the mounting cushion 150 from a second side 159 that is opposite from the first side 157.

Figure 4:
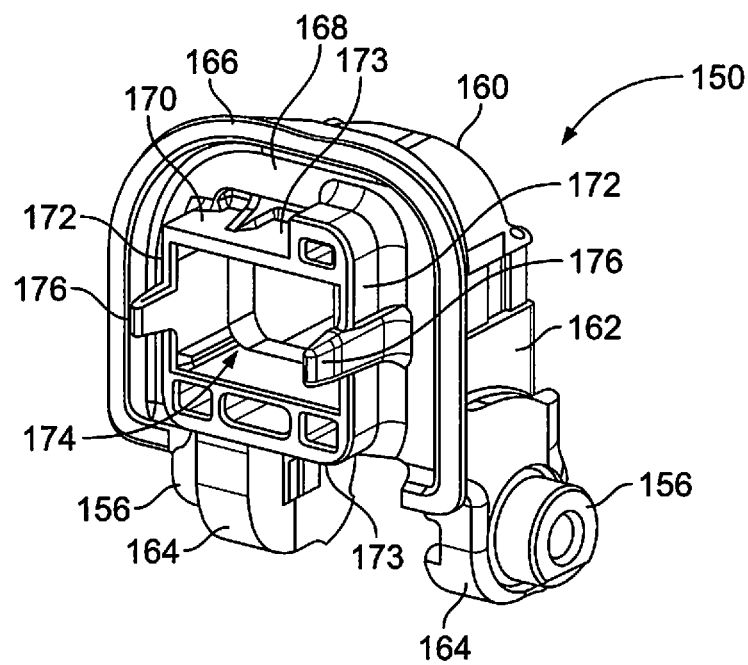
FIG. 4 illustrates a perspective rear view of a mounting cushion, according to an embodiment of the present disclosure.

FIG. 4 illustrates a perspective rear view of the mounting cushion 150, according to an embodiment of the present disclosure. The mounting cushion 150 includes a main body 160 having an outer wall 162. Connection prongs 164 downwardly extend (as oriented in FIG. 4) from opposite ends of the outer wall 162. A mounting stud 156 outwardly extends from a lateral surface of each connection prong 164.

A flange 166 may extend over and outwardly from at least a portion of the outer wall 162. The flange 166 is positioned around a base 168. A clip retainer 170 outwardly extends from the base 168. The clip retainer 170 includes lateral walls 172 connected to orthogonal walls 173. A central channel 174 is formed through the clip retainer 170 and extends through the mounting cushion 150. Extension beams 176 may outwardly extend from the lateral walls 172. The clip retainer 170 is configured to retain the retaining clip 152 (shown in FIG. 3).

Figure 5:
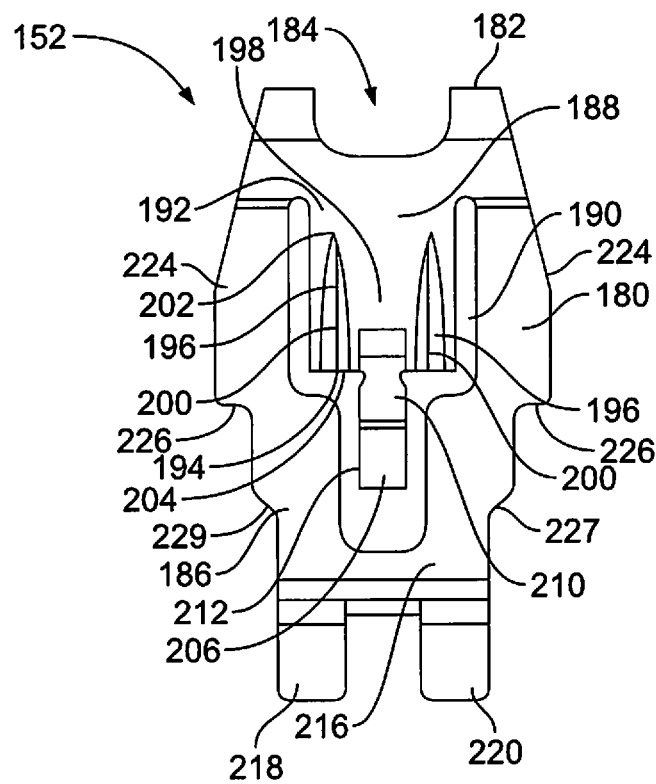
FIG. 5 illustrates a front view of a retaining clip, according to an embodiment of the present disclosure.
Figure 6:
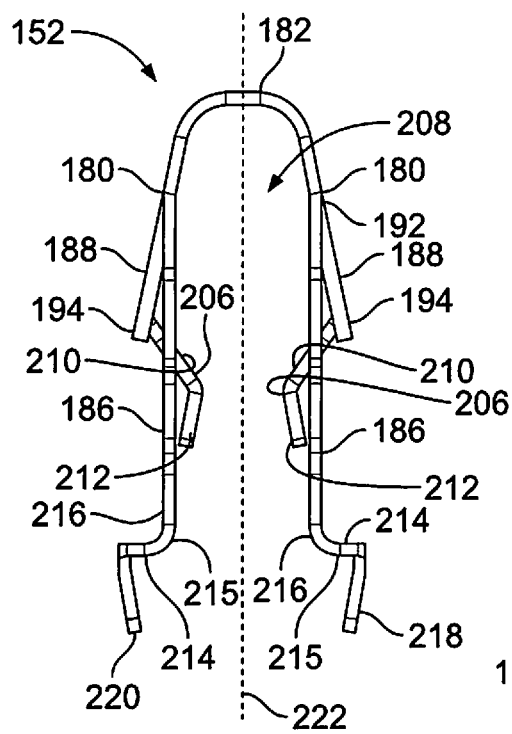
FIG. 6 illustrates a lateral view of a retaining clip, according to an embodiment of the present disclosure.
Figure 7:
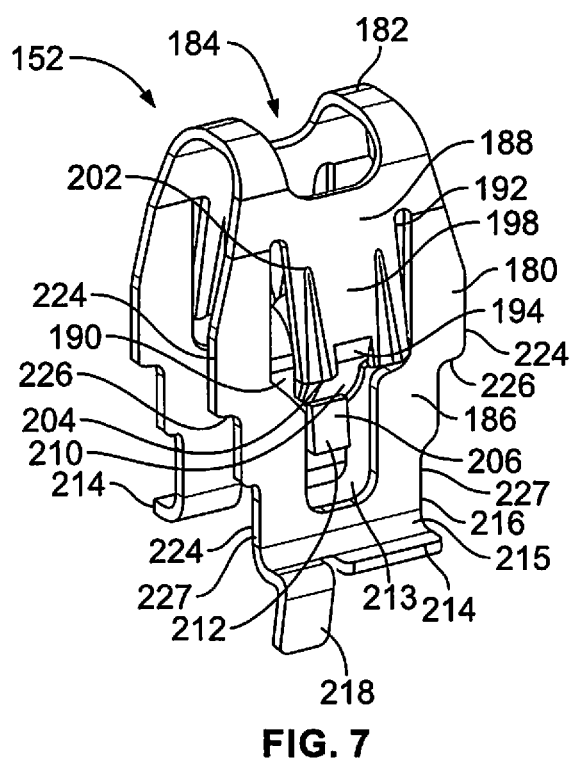
FIG. 7 illustrates a perspective view of a retaining clip, according to an embodiment of the present disclosure.

FIG. 5 illustrates a front view of the retaining clip 152, according to an embodiment of the present disclosure. FIG. 6 illustrates a lateral view of the retaining clip 152. FIG. 7 illustrates a perspective view of the retaining clip 152. Referring to FIGS. 5-7, the retaining clip 152 includes two legs 180 connected by a curved segment 182 (such as a curved beam, strap, or the like), which may include an opening 184 formed therethrough. Each leg 180 includes a flat panel 186. The panels 186 of the legs 180 may be generally parallel with one another. Angled retaining beams 188 downwardly extend on either side of the strap 182 over openings 190 formed in the legs 180. As shown, the retaining beams 188 outwardly cant from stems 192 that connect to the strap 182 towards distal ends 194.

The retaining beams 188 outwardly extend in opposite directions. For example, one retaining beam 188 outwardly extends in a first direction, while an opposite retaining beam 188 outwardly extends in a second direction that is opposite from the first direction. As such, each side of the retaining clip 152 includes a retaining beam 188 that outwardly extends.

Gussets 196 may outwardly extend from an outer surface of each retaining beam 188. As shown, each retaining beam 188 may include two gussets 196 separated by a space 198. Longitudinal axes 200 of the gussets 196 on each retaining beam 188 may be parallel with one another. As shown, each gusset 196 progressively expands in width and height from an origin 202 proximate to the stem 192 towards a terminal end 204 proximate to the distal end 194. The gussets 196 provide increased strength to the retaining beams 188. In at least one embodiment, the gussets 196 provide increased retaining force in relation to a body bracket that secures to a structural component, such as the component 102 (shown in FIG. 1).

A service tab 206 extends downwardly and inwardly from the distal end 194 of each retaining beam 188. As shown, the service tabs 206 are axially aligned with one another, and extend toward one another in a space 208 between the opposed legs 180. Each service tab 206 includes an extension segment 210 that inwardly and downwardly extends from the distal end 194 of the retaining beam 188. An engagement segment 212 downwardly and outwardly extends from the extension segment 210. As shown, the engagement segments 212 may not outwardly extend through the openings 190. In at least one other embodiment, the engagements segments 212 may outwardly extend through the openings 190.

Referring again to FIGS. 5-7, a ledge 214 outwardly extends from an outturned arcuate transition segment 215 that outwardly and downwardly extends from a distal end 216 of each leg 180. The ledge 214 may be perpendicular to the panel 186. Service tabs 218 may downwardly and inwardly cant from the transition segment 215. As shown in FIG. 6, in particular, the service tabs 218 are angled toward a longitudinal axis 222 of the retaining clip 152. As shown, the services tabs 218 and 220 extending from the opposed legs 180 may be diagonally positioned relative to one another. For example, the service tab 218 extends from a first end of a transition segment 215, while the service tab 220 extends from a second end (opposite from the first end) of an opposed transition segment 215.

The panel 186 of each leg 180 includes lateral stabilizers 224. Exposed lower retaining edges 226 of the stabilizers 224 provide abrupt, blunted surfaces. The exposed lower retaining edges 226 are configured to provide locations that directly engage a portion of a component, such as the component 102 (shown in FIG. 1), or a securing bracket of the component 102.

Lower portions 227 of the legs 180 may include contoured surfaces that are configured to engage reciprocal interior surfaces of a clip retainer 170 (shown in FIGS. 2-4) in order to securely retain the retaining clip 152 to the mounting cushion 150. As shown, the contoured surface may include an abrupt reduction 229 in width to provide a contact surface in relation to the mounting cushion that may surround (or substantially surround) the central channel 174 (shown in FIG. 4). The contact interface between the retaining clip 152 and the mounting cushion 150 limits further advancement of the retaining clip 152 into the central channel 174.

Referring to FIGS. 2-7, the retaining clips 152 are inserted into the central channels 174 of the mounting cushions 150. The opposed legs 180 of each retaining clip 152 may be squeezed together so that the ledges 214 are able to fit within the central channels 174. The retaining clips 152 are urged into the central channels 174 in the direction of arrows A until the ledges 214 pass out the other side of the central channels 174. As the ledges 214 extend out of the central channels 174, the legs 180 deflect back to their at-rest positions, and the ledges 214 latch, hook, or otherwise secure to portions of the mounting cushions 150. In this position, the exposed lower retaining edges 226 of the stabilizers 224 of the panels 186 of the legs 180 are configured to abut into a surface of a component (such as the component 102 of FIG. 1 or a securing bracket of the component 102).

Figure 8:
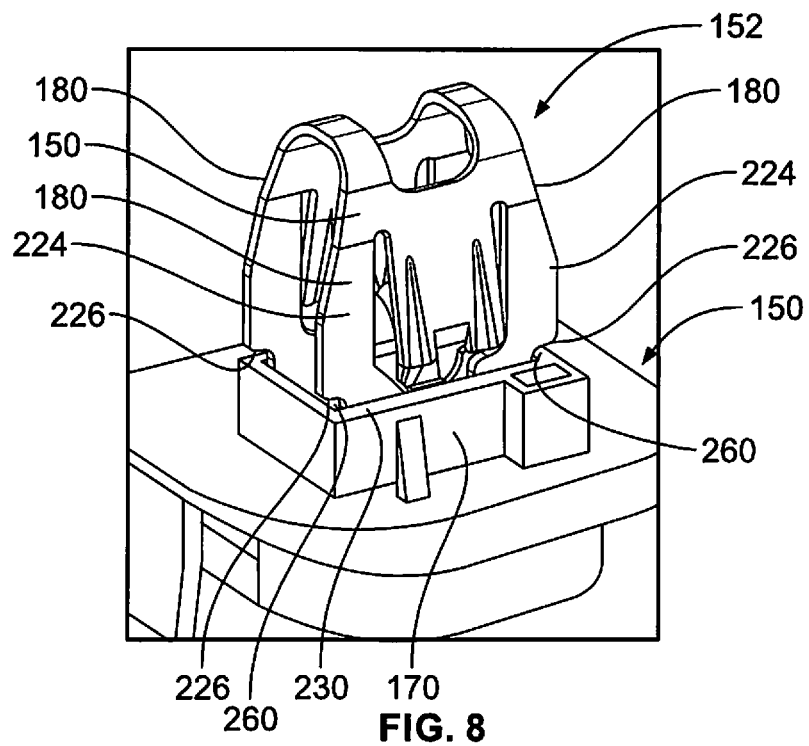
FIG. 8 illustrates a perspective view of a retaining clip secured to a mounting cushion, according to an embodiment of the present disclosure.

FIG. 8 illustrates a perspective view of a retaining clip 152 secured to a mounting cushion 150, according to an embodiment of the present disclosure. As shown, the exposed lower retaining edges 226 of the retaining clip 152 are spaced apart from upper edges 230 of the clip retainer 170, thereby providing a component-securing space 260 therebetween. A portion of a securing bracket or component is configured to be sandwiched between the lower retaining edges 226 of the stabilizers 224 and an upper edge of the clip retainer 170.

Each leg 180 provides two stabilizers 224, each of which includes an exposed lower retaining edge 226. Each lower retaining edge 226 provides a retention location with respect to the component. Therefore, each retaining clip 152 provides a total of four retention locations in relation to a component and/or a securing bracket coupled to the component. The four retention locations effectively and evenly distribute loads/forces, and provide a stable, robust, and rigid connection to the component.

Referring to FIGS. 2-8, in at least one embodiment, after the mounting cushion 150 is removed from the retaining clip 152 (which may still be secured to a vehicle body bracket), the service tabs 212 may be accessible from within a vehicle cabin. The two service tabs 212 may be inwardly deflected (for example, squeezed together), thereby causing the retaining beams 188 to inwardly deflect, and the four retention locations (defined by the four lower retaining edges 226) to disengage from the component 102 (shown in FIG. 1), thereby allowing for clearance and removal of the retaining clip 152 from the component 102 (shown in FIG. 1).

Referring again to FIG. 3, each cover 154 includes a cap 240, and a central pillar 242 outwardly extending from an interior surface of the cap 240. The central pillar 240 includes a connection wall 244 spanning between perpendicular lateral support walls 246. A through-hole 248 (or hole) is formed through the connection wall 244. The hole 248 may allow portions of the retaining clip 152 (such as the service tabs 206) to inwardly deflect as the assist grip assembly 100 is secured to a structural component, such as a frame or bracket of a vehicle.

The central pillar 240 supports inner fingers of a service feature (such as the service tabs 206) of the retaining clip 152. In at least one embodiment, compressive force is translated into the central pillar 240 and thereby supports the assist grip assembly 100 with respect to the structural component.

Referring to FIGS. 3-7, after (or optionally before) the retaining clips 152 are secured to the mounting cushions 150, the central pillars 242 are aligned with the central channels 174 opposite from the retaining clips 152. Each cover 154 is then urged toward a respective mounting cushion 150 in the direction of arrow B, such that the central pillars 242 are urged into the central channels 174 opposite from the retaining clips 152. In at least one embodiment, at least portions of the service tabs 206 (such as the transition areas between extension segments 210 and the engagement segments 212) may deflect into the holes 248. The caps 240 may also include structures that snapably secure to reciprocal structures of the mounting cushions 150.

Accordingly, each fastening assembly 130 is formed by a mounting cushion 150 coupled to a retaining clip 152 and a cover 154. After the fastening assembly 130 is formed, the fastening assembly 130 is urged into a retention chamber 122. Within the retention chamber 122, each mounting stud 156 is pivotally secured within a respective pivot channel 140, thereby providing an integral pivot axis for the fastening assembly 130 relative to the handle 110 (without the need for a separate and distinct pivot pin).

Figure 9:
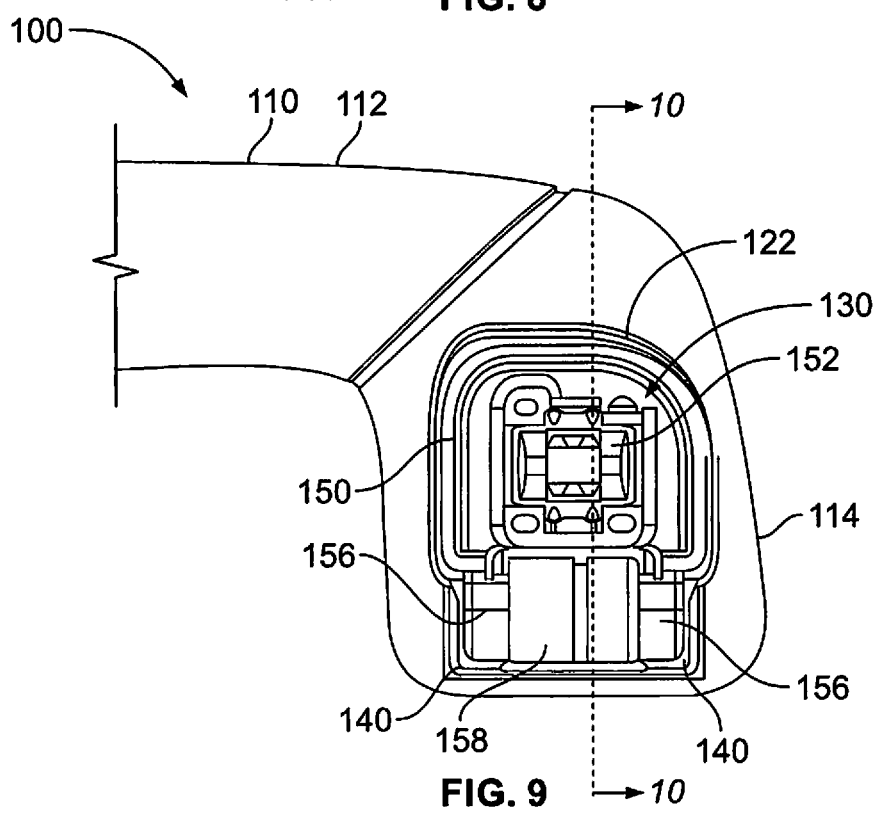
FIG. 9 illustrates a rear view of a fastening assembly secured within a recessed channel of a handle of an assist grip assembly, according to an embodiment of the present disclosure.
Figure 10:
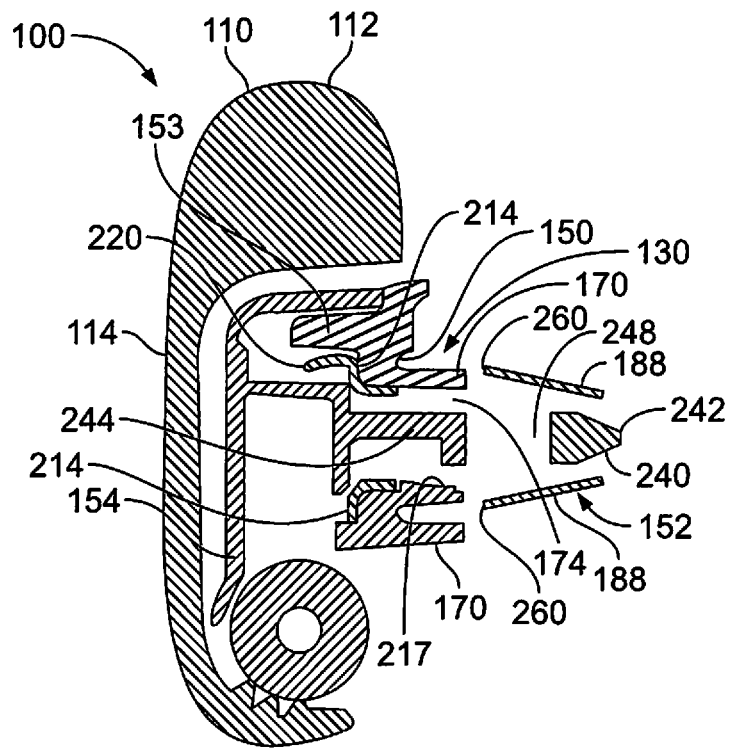
FIG. 10 illustrates a cross-sectional view of a fastening assembly secured within a recessed channel of a handle of an assist grip assembly through line 10-10 of FIG. 9, according to an embodiment of the present disclosure.

FIG. 9 illustrates a rear view of a fastening assembly 130 secured within a recessed channel 122 of the handle 110 of the assist grip assembly 100, according to an embodiment of the present disclosure. FIG. 10 illustrates a cross-sectional view of the fastening assembly 130 secured within the recessed channel 122 of the handle 110 of the assist grip assembly 100 through line 10-10 of FIG. 9. As shown in FIG. 10, the ledges 214 of the retaining clip 152 latch, hook, or otherwise secure to front surfaces of the mounting cushion 150. The retaining beams 188 are separated from the clip retainer 170, thereby providing the component-securing space 260 therebetween.

The diagonally separated service tabs 218 (shown in FIGS. 5-7) and 220 inwardly angle away from an outer wall portion 153 of the mounting cushion 150, which allows for clearance during servicing. That is, the inwardly angled tabs 218 and 220 may be easily engaged as they are spaced apart from wall portions of the mounting clearance, and compressed inwardly so that the ledges 214 disengage from the mounting cushion 150, which may then be slid off the retaining clip 152. Inward compression (for example, squeezing) of the service tabs 218 and 220 provides clearance in relation to the mounting cushion 150, which allows the retaining clip 152 to be removed from the mounting cushion 150, or vice versa (such as during servicing).

After the fastening assemblies 130 are secured to the handle 110, the handle 110 may be secured to a structural component, such as the component 102 of FIG. 1. Optionally, the retaining clip 152 may first be secured to the component 102, and then the remainder of the fastening assembly 130 (such as the mounting cushion 150 and the cover 154), whether attached to the handle 110 or not, may be secured to the retaining clip 152.

The mounting cushion 150 may also include at least one secondary retention shelf 217, which is generally at least partially offset with respect to at least one of the ledges 214. In at least one embodiment, the secondary retention shelf 217 may extend from the outer wall portion 153 of the mounting cushion into the channel 174. In at least one other embodiment, the secondary shelf 217 extends from an opposite portion of the mounting cushion 150. The secondary retention shelf 217 supports a portion of the retaining clip 152, thereby increasing connection strength between the mounting cushion 150 and the retaining clip 152. For example, the secondary retention shelf 217 may be retained within the opening 213 (shown in FIG. 7) of the retaining clip 152. For example, the retaining clip 152 may hook or rest onto the secondary retention shelf 217 via the opening 213. The secondary retention shelf 217 may be configured to maintain the retaining clip 152 in position with respect to the mounting cushion 150 when the fastening assembly 130 is subjected to forces that would otherwise tend to separate the retaining clip 152 from the mounting cushion 150. The secondary retention shelf 217 may be offset from a central plane of the mounting cushion 150, or aligned with the central plane. Optionally, the mounting cushion 150 may include more than one secondary retention shelf 217 on one or both sides of the mounting cushion 150.

Figure 11:
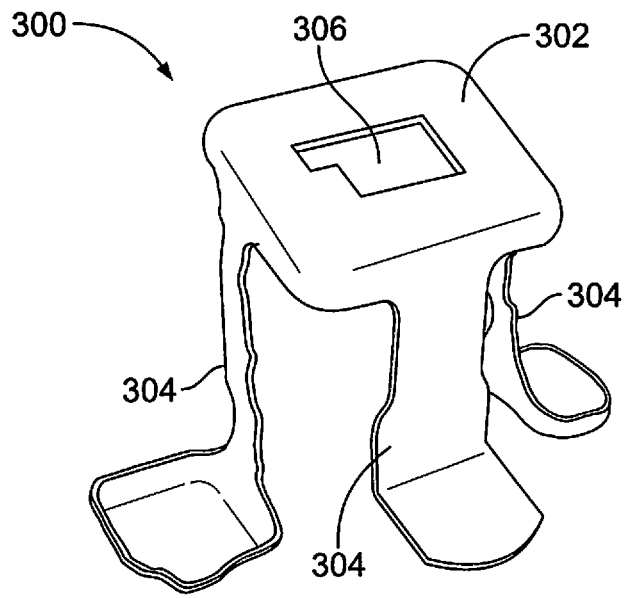
FIG. 11 illustrates a perspective top view of a securing bracket, according to an embodiment of the present disclosure.

FIG. 11 illustrates a perspective top view of a securing bracket 300, according to an embodiment of the present disclosure. The securing bracket 300 is secured to a component, such as the component 102 shown in FIG. 1, and is configured to securely connect the component 102 to the assist grip assembly 100 (shown in FIG. 1) through the fastening assembly 130 (shown in FIGS. 2 and 3, for example). In at least one embodiment, the component includes the securing bracket 300.

The securing bracket 300 may include a planar base 302 having a plurality of legs 304 extending downwardly therefrom. The securing bracket 300 may include more or less legs 304 than shown. In at least one embodiment, the securing bracket 300 may not include any legs.

A retention channel 306 is formed through the base 302. A portion of the retaining clip 152 (shown in FIGS. 3 and 5-10) is configured to be received by the base 302 within the retention channel 306. In at least one other embodiment, the retaining clip 152 may directly secure to the component 102 without a separate and distinct securing bracket 300. For example, the component 102 may include one or more retention channels.

Figure 12:
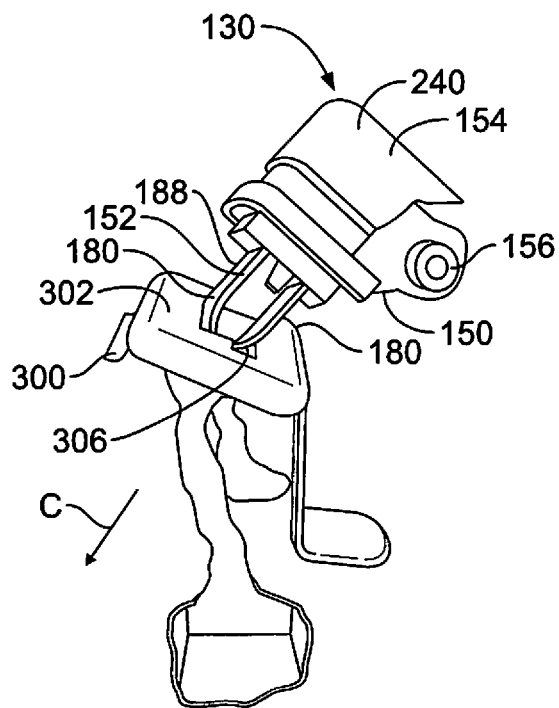
FIG. 12 illustrates a perspective lateral view of a fastening assembly positioned over a retention channel of a securing bracket, according to an embodiment of the present disclosure.

FIG. 12 illustrates a perspective lateral view of a fastening assembly 130 positioned over the retention channel 306 of the securing bracket 300, according to an embodiment of the present disclosure. As shown, the fastening assembly 130 may first be formed, and secured to the securing bracket 300, after which the handle 110 (shown in FIGS. 2 and 3, for example) may be secured to the fastening assembly 130, as described above. Optionally, the fastening assembly 130 is first secured to the handle 110, and then secured to the securing bracket 300.

In an initial position, the retaining clip 152 is aligned with the retention channel 306 and the curved segment 182 provides a lead-in nose that leads the retaining clip 152 into the retention channel 306. The retaining clip 152 is then urged into the retention channel 306 in the direction of arrow C. As the retaining clip 152 is urged into the retention channel 306, the outwardly-angled retaining beams 188 slide over edges of the base 302 that define the retention channel 306, thereby compressing the retaining beams 188 and/or the legs 180 inwardly. The angled retaining beams 188 locate (for example, center) and guide the retaining clip 152 into and through the retention channel 306. With continued urging in the direction of arrow C, the retaining beams 188 slide through the retention channel 306 and deflect back to at-rest positions on an opposite side of the base 302, and catch on lower edges of the base 302 that define the retention channel 306.

Figure 13:
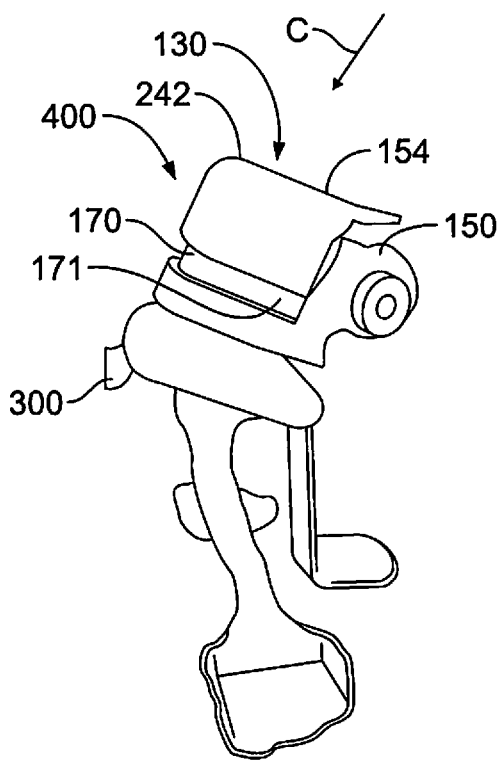
FIG. 13 illustrates a perspective lateral view of a fastening assembly in a secured position with respect to a securing bracket, according to an embodiment of the present disclosure.

FIG. 13 illustrates a perspective lateral view of the fastening assembly 130 in a secured position with respect to the securing bracket 300, according to an embodiment of the present disclosure. A securing system 400 includes the fastening assembly 100 that secures to the handle 110 (shown in FIGS. 2 and 3, for example) and the component 102 (shown in FIG. 1), which may include the securing bracket 300. As shown in FIG. 13, the cover 154 fits over the clip retainer 170, which may include latching features, such as notches 171 that are configured to snapably retain reciprocal features, such as ramps, tabs, or the like, inwardly extending from interior walls of the cap 242. As the cover 154 is pushed downwardly toward the clip retainer 170 in the direction of arrow C, the features of the cover are snapably secured to the notches 171.

Figure 14:
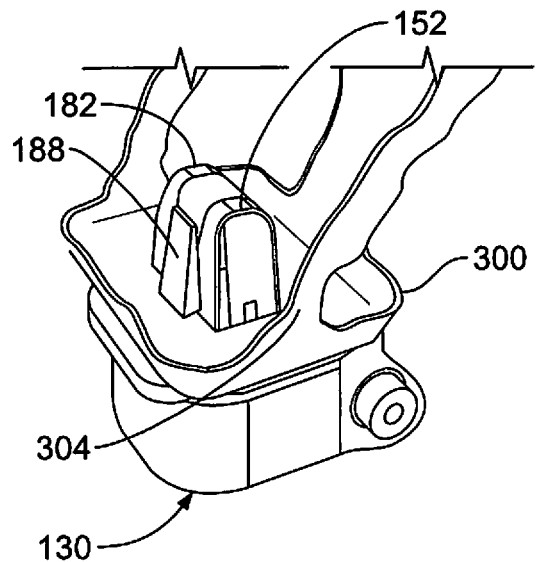
FIG. 14 illustrates a perspective bottom view of a fastening assembly in a secured position with respect to a securing bracket, according to an embodiment of the present disclosure.

FIG. 14 illustrates a perspective bottom view of the fastening assembly 130 in a secured position with respect to the securing bracket 300, according to an embodiment of the present disclosure. As shown, the retaining beams 188 abut into the lower surface of the base 302 surrounding the retention channel 306. Edge portions of the base 302 are compressively sandwiched within the component-securing space 260 (shown in FIG. 10) between the retaining beams 188 and the upper edge 230 of the clip retainer 170 (shown in FIG. 10), thereby securely fastening the fastening assembly 130 to the securing bracket 300, and therefore the component 102 (shown in FIG. 1).

As described above with respect to FIGS. 1-14, the fastening assembly 130 efficiently, robustly, safely, and reliably secures the handle 110 to the component 102. The fastening assembly 130 pivotally secures the handle 110 to the component 102 without the use of separate and distinct pins, screws, bolts, or other such fasteners.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Additionally, numerical terms such as first, second, third, and fourth may be used to describe embodiments of the present disclosure. It is to be understood that such terms merely identify a number of a particular feature. For example, a first feature may be a second feature, and vice versa.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. An assist grip assembly that is configured to be secured to a component, the assist grip assembly comprising:
   a handle defining a retention chamber; and
   a fastening assembly pivotally secured to the retention chamber of the handle, the fastening assembly comprising:
      a mounting cushion having a central channel and at least one mounting stud pivotally coupled to the retention chamber, wherein the mounting cushion secures the fastening assembly to the handle; and
      a retaining clip coupled to the mounting cushion from a first side, wherein the retaining clip is configured to secure to the component, the retaining clip comprising:

a first leg connected to a second leg through a curved segment;
a first retaining beam outwardly angled from the first leg; and
a second retaining beam outwardly angled from the second leg, wherein the second retaining beam outwardly angles away from the first retaining beam,
wherein at least one of the first and second retaining beams comprises at least one gusset, wherein the at least one gusset progressively expands in width and height from an origin proximate to the curved segment toward a terminal end proximate to one of a distal end of the first retaining beam or a distal end of the second retaining beam.

2. The assist grip assembly of claim 1, wherein the fastening assembly further comprises a cover coupled to the mounting cushion from a second side that is opposite from the first side.

3. The assist grip assembly of claim 2, wherein at least a portion of the retaining clip is received and retained within the central channel of the mounting cushion, and wherein at least a portion of the cover is received and retained with the central channel of the mounting cushion, wherein the mounting cushion further comprises at least one secondary retention shelf, wherein at least a portion of the retaining clip is supported by the secondary retention shelf of the mounting cushion.

4. The assist grip assembly of claim 1, wherein the handle comprises a grasping beam connected to at least one extension beam, and wherein the retention chamber is formed in the at least one extension beam.

5. The assist grip assembly of claim 1, wherein the retaining clip further comprises:
a first service tab extending from the distal end of the first retaining beam; and
a second service tab extending from the distal end of the second retaining beam.

6. The assist grip assembly of claim 1, wherein the retaining clip further comprises:
a first ledge outwardly extending from a distal end of the first leg, wherein the first ledge is latched onto a first portion of the mounting cushion; and
a second ledge outwardly extending from a distal end of the second leg, wherein the second ledge is latched onto a second portion of the mounting cushion.

7. The assist grip assembly of claim 1, wherein the retaining clip further comprises:
a first service tab extending from a distal end of the first leg; and
a second service tab extending from a distal end of the second leg.

8. The assist grip assembly of claim 1, wherein each of the first leg and the second leg comprises two lateral stabilizers that provide four retention locations that are configured to abut into a portion of the component, wherein the portion of the component is configured to be securely sandwiched within a component-securing space between the four retention locations and a clip retainer of the mounting cushion.

9. The assist grip assembly of claim 1, wherein the cover comprises:
a cap; and
a central pillar extending from the cap, wherein the central pillar extends into the central channel of the mounting cushion.

10. The assist grip assembly of claim 9, wherein a hole is formed through the central pillar, and wherein at least a portion of the retaining clip is deflected into the hole.

11. A securing system comprising:
a component defining a retention channel; and
an assist grip assembly secured to the component, the assist grip assembly comprising:
a handle defining a retention chamber; and
a fastening assembly pivotally secured to the retention chamber of the handle, the fastening assembly comprising:
a mounting cushion having a central channel and at least one mounting stud pivotally coupled to the retention chamber, wherein the mounting cushion secures the fastening assembly to the handle; and
a retaining clip coupled to the mounting cushion from a first side, wherein the retaining clip is secured to the component, the retaining clip comprising:
a first leg connected to a second leg through a curved segment;
a first retaining beam outwardly angled from the first leg; and
a second retaining beam outwardly angled from the second leg, wherein the second retaining beam outwardly angles away from the first retaining beam,
wherein each of the first leg and the second leg comprises two lateral stabilizers that provide four retention locations that are configured to abut into a portion of the component, wherein the portion of the component is configured to be securely sandwiched within a component-securing space between the four retention locations and a clip retainer of the mounting cushion.

12. The securing system of claim 11, wherein the handle comprises a grasping beam connected to at least one extension beam, and wherein the retention chamber is formed in the at least one extension beam.

13. The securing system of claim 11,
wherein the first retaining beam comprises at least one first gusset, wherein the at least one first gusset progressively expands in width and height from a first origin proximate to the curved segment toward a first terminal end proximate to a distal end of the first retaining beam,
wherein a first service tab extends from the distal end of the first retaining beam;
wherein the second retaining beam comprises at least one second gusset, wherein the at least one second gusset progressively expands in width and height from a second origin proximate to the curved segment toward a second terminal end proximate to a distal end of the second retaining beam;
wherein a second service tab extends from the distal end of the second retaining beam;
wherein a third service tab extends from the first leg; and
wherein a fourth service tab extends from the second leg.

14. The securing system of claim 13, wherein the retaining clip further comprises:
a first ledge outwardly extending from the first leg, wherein the first ledge is latched onto a first portion of the mounting cushion; and
a second ledge outwardly extending from the second leg, wherein the second ledge is latched onto a second portion of the mounting cushion.

15. The securing system of claim 13, wherein each of the first leg and the second leg comprises two lateral stabilizers that provide four retention locations that are configured to abut into a portion of the component, wherein the portion of the component is securely sandwiched within a component-securing space between the four retention locations and a clip retainer of the mounting cushion.

16. The securing system of claim 11, wherein the cover comprises:
   a cap; and
   a central pillar extending from the cap, wherein the central pillar extends into the central channel of the mounting cushion.

17. The securing system of claim 16, wherein a hole is formed through the central pillar, and wherein at least a portion of the retaining clip is deflected into the hole.

18. An assist grip assembly that is configured to be secured to a component, the assist grip assembly comprising:
   a handle including a grasping beam connected to at least one extension beam, wherein a retention chamber is formed in the at least one extension beam; and
   a fastening assembly pivotally secured to the retention chamber of the handle, the fastening assembly comprising:
      a mounting cushion having a central channel, at least one mounting stud pivotally coupled to the retention chamber, and at least one secondary retention shelf, wherein the mounting cushion secures the fastening assembly to the handle;
      a retaining clip coupled to the mounting cushion from a first side, wherein the retaining clip is configured to secure to the component, wherein at least a portion of the retaining clip is received and retained within the central channel of the mounting cushion, wherein at least a portion of the retaining clip is supported by the secondary retention shelf of the mounting cushion, wherein the retaining clip comprises: (a) a first leg connected to a second leg through a curved segment, wherein each of the first leg and the second leg comprises two lateral stabilizers that provide four retention locations that are configured to abut into a portion of the component, wherein the portion of the component is configured to be securely sandwiched within a component-securing space between the four retention locations and a clip retainer of the mounting cushion, (b) a first retaining beam outwardly angled from the first leg, wherein the first retaining beams includes a first gusset that progressively expands in width and height from a first origin proximate to the curved segment toward a first terminal end proximate to a distal end of the first retaining beam, (c) a second retaining beam outwardly angled from the second leg, wherein the second retaining beam outwardly angles away from the first retaining beam, wherein the second retaining beams includes a second gusset that progressively expands in width and height from a second origin proximate to the curved segment toward a second terminal end proximate to a distal end of the second retaining beam, (d) a first service tab extending from the distal end of the first retaining beam, (e) a second service tab extending from the distal end of the second retaining beam, (t) a third service tab extending from the first leg, (g) a fourth service tab extending from the second leg, (h) a first ledge outwardly extending from the first leg, wherein the first ledge is latched onto a first portion of the mounting cushion, (i) a second ledge outwardly extending from the second leg, wherein the second ledge is latched onto a second portion of the mounting cushion; and
      a cover coupled to the mounting cushion from a second side that is opposite from the first side, wherein the cover comprises a cap, and a central pillar extending from the cap, wherein the central pillar extends into the central channel of the mounting cushion, wherein a hole is formed through the central pillar, and wherein at least a portion of the retaining clip is deflected into the hole.

* * * * *